United States Patent [19]
Acevedo et al.

[11] Patent Number: 5,900,473
[45] Date of Patent: May 4, 1999

[54] RADIATION CURABLE PRESSURE SENSITIVE ADHESIVES

[75] Inventors: Margarita Acevedo, Minneapolis, Minn.; Hans F. Huber, Willendorf, Austria

[73] Assignee: H.B. Fuller Licensing & Financing, Inc., St. Paul, Minn.

[21] Appl. No.: 09/089,755

[22] Filed: Jun. 2, 1998

Related U.S. Application Data

[60] Provisional application No. 60/049,644, Jun. 16, 1997.
[51] Int. Cl.$^6$ ..................................................... C08G 63/00
[52] U.S. Cl. .............................. 528/271; 522/90; 522/97; 522/104; 528/272; 528/296; 528/302
[58] Field of Search .................................... 528/271, 272, 528/296, 302; 522/90, 97, 104

[56] References Cited

U.S. PATENT DOCUMENTS

| | | | |
|---|---|---|---|
| 4,668,763 | 5/1987 | Muller et al. | 528/296 |
| 4,822,829 | 4/1989 | Muller et al. | 522/90 |
| 5,281,682 | 1/1994 | Cornforth et al. | 526/273 |

*Primary Examiner*—Terressa Mosley
*Attorney, Agent, or Firm*—Carolyn A. Fischer

[57] ABSTRACT

The present invention discloses radiation curable pressure-sensitive adhesives comprising the reaction product of a blend of at least two hydroxy polyesters having different Tgs, and at least one prepolymer functionalized with (Meth) acrylates, isocyanates and mixtures thereof. The present invention further discloses a blend of at least two hydroxy polyesters wherein at least one of the hydroxy polyesters has a Tg of less than −35° C., and at least one of the other hydroxy polyesters has a Tg of greater than about −35° C.

20 Claims, 4 Drawing Sheets

- ■ = AD with prepolymer M/H to 50%
- ♦ = Blends with prepolymer L/H to 50%
- ▲ = AD with prepolymer L/H to 60% and tackifier
- ● = AD with prepolymer L/H to 60%
- ▬ = Single polyester "A" with prepolymer L/H

- ■ = AD with prepolymer M/H to 50%
- ♦ = Blends with prepolymer L/H to 50%
- ▲ = AD with prepolymer L/H to 60% and tackifier
- ● = AD with prepolymer L/H to 60%
- − = Single polyester "A" with prepolymer L/H

RADIATION CURABLE PRESSURE SENSITIVE ADHESIVES

FIELD OF THE INVENTION

This application is a Continuation-In-Part of provisional patent application 60/049,644 filed Jun 16, 1997.

FIELD OF THE INVENTION

This invention relates to compositions comprising at least two hydroxy polyesters which are reacted with a prepolymer functionalized with (meth)acrylates, isocyanates and mixtures thereof. Specifically, the invention relates to pressure-sensitive adhesive compositions prepared by reacting a blend of two or more hydroxy polyesters with a prepolymer functionalized with (meth)acrylates, isocyanates and mixtures thereof; applying the composition to a substrate and radiation curing the composition.

BACKGROUND OF THE INVENTION

Adhesives prepared from radiation curing a composition comprising a single hydroxy polyester reacted with a prepolymer functionalized with a (meth)acrylate and/or isocyanate is known.

U.S. Pat. No. 4,668,763 to Müller et al., May 26, 1987, pertains to a hydroxy polyester which is fluid at room temperature, with a low viscosity, relatively high molecular weight and very low setting points having alkyl side chains in substantially regular arrangement. Preferably, the polyester chains are unbranched or only slightly branched.

U.S. Pat. No. 4,822,829 to Müller et al., Apr. 18, 1989, pertains to radiation-setting (meth)acrylate-functional polyesters prepared from base polyesters which are fluid at room temperature and have molecular weights of 1,000 or more as well as aliphatic side chains bound to the main chain by ester bridges and, in some cases, ether bridges, and in which a maximum of 90% of the original hydroxy groups of the base polyester are functionalized. The radiation-setting (meth)acrylate-functional polyesters are usable for coatings and especially as adhesives free of solvents.

U.S. Pat. No. 5,281,682 to Comforth et al., Jan. 25, 1994, relates to improved radiation curable compositions which comprise N-vinylformamide and an oligomer selected from the group consisting of epoxy-acrylate resins, polyester acrylate resins, polyurethane acrylate resins and mixtures thereof.

Although the ease of application has been improved as a result of developing such low viscosity polyesters, development efforts continue to strive to address improvements of other properties. Accordingly, industry would find advantage in radiation-curable compositions exhibiting a substantial improvement in flexibility, shear resistance at high temperatures, peel adhesion, and wet-out properties.

SUMMARY OF THE INVENTION

The present invention discloses radiation curable pressure-sensitive adhesives comprising the reaction product of a blend of at least two hydroxy polyesters having different glass transition temperatures (Tgs), with at least one prepolymer functionalized with (meth)acrylates, isocyanates and mixtures thereof. The present invention further discloses a composition comprising the reaction product of a blend of at least two hydroxy polyesters, wherein the difference in glass transition temperature (Tg) between the hydroxyl polyesters is at least about 10° C., preferably greater than about 15° C., and more preferably greater than about 20° C. Preferably, the composition comprises the reaction product of a blend of at least two hydroxy polyesters wherein the first hydroxy polyester has a Tg of less than about −35° C. and the second hydroxy polyester has a Tg greater than about −35° C. In a more preferred embodiment, the first hydroxy polyester is characterized as having a Tg ranging from about −60° C. to about −30° C., and the second hydroxy polyester has a Tg ranging from about −20° C. to about 30° C.

In another embodiment, the present invention discloses radiation curable compositions comprising a hydroxyl polyester having a Tg higher than the polyesters used in previous radiation curable adhesive compositions.

By combining at least two hydroxy polyesters having a difference in Tg of at least about 10° C. and then reacting the mixture with at least one functionalized prepolymer, the resulting copolymer contains a larger number of linkages between harder and softer blocks than what can be achieved by employing a single hydroxy polyester, or from combining the reaction products produced from the same single hydroxy polyesters reacted individually with the same prepolymer.

In another embodiment the present invention is a composition comprising the reaction product of at least two hydroxy polyesters having a difference in Tg of at least about 10° C. with at least one prepolymer functionalized with (meth)acrylates, isocyanates, and mixtures thereof, which further comprises other additives such as reactive diluents, tackifiers, plasticizers, fillers, stabilizers and photoinitiators.

The polymers of the present invention appear to be solid but are actually very viscous liquids at room temperature in view of their cold flow properties and thus, are typically applied as warm melts, employing an application temperature ranging from 70° C. to 120° C. However, upon combining the reacted hydroxyl polyester blends of the present invention with other reactive diluents such as acrylic monomers and oligomers, the resulting mixture may be applied at room temperature. Examples of room temperature applied PSAs are given.

The radiation cured adhesives of the present invention exhibit excellent flexibility, excellent shear resistance at high temperatures and excellent wet-out properties as well as good peel adhesion. The adhesive composition of the present invention preferably exhibits a substantial improvement in at least one adhesive property. More preferably, the radiation cured adhesive composition exhibits an improved balance of properties such that at least one property is enhanced while also maintaining or improving other properties simultaneously. Accordingly, the radiation cured adhesive compositions preferably exhibit a "Peel" of at least about 1.5 N/25 mm, and/or a "Loop Tack" of at least about 4 N, and/or a "Shear" of greater than 24 hours at 100° C. under 2 psi. More preferably the "Loop Tack" is at least 2 times and preferably 3 to 4 times greater than the "Peel".

BRIEF DESCRIPTION OF FIGURES

FIG. 1A also depicts the adhesive properties of the reaction product of AD polyester with L/H prepolymers to 60% conversion of the OH groups (H2).

DETAILED DESCRIPTION OF THE INVENTION

In general, radiation curable pressure sensitive adhesives, PSAs, are prepared by reacting hydroxy polyesters with a prepolymer having acrylate functionality, isocyanate functionality and mixtures thereof. Typically the OH (hydroxyl):NCO (isocyanate) ratio is greater than 2:1 to insure that all the isocyanate groups are reacted and the resulting uncured product carries hydroxyl groups and terminal acrylic bonds. The resulting polymer is essentially a block copolymer with the blocks being linked together by urethane groups as schematized below:

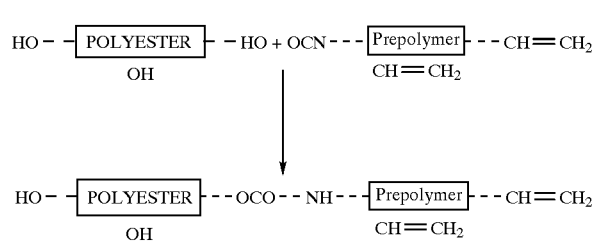

(I)

The reaction is controlled to optimize the statistical distribution of the radiation curable acrylate groups. For example, in the case of reacting a linear hydroxyl polyester, having two terminal hydroxyls, with a prepolymer having an isocyanate functionality of 1.0 at a 1:1 molar ratio, 50% conversion of the hydroxyl groups is achieved. However, there will be a number of polyester molecules in which both hydroxyl groups have reacted as well as an equal number of polyester molecules without functionalization. This distribution affects the cured product since the bifunctional polyester molecules tend to crosslink, whereas the non-functionalized molecules act as polymeric plasticizers. The optimization of this statistical distribution of the functional groups yields the desired adhesive performance.

Radiation curing results in polymerization of the acrylic moiety yielding a block copolymer of the following structure:

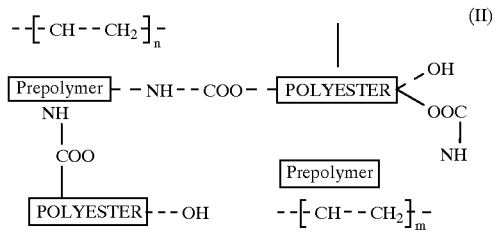

(II)

The present inventors conducted a study of radiation cured PSAs based on a single polyester, varying the prepolymer to determine the effects of three different variables, namely 1) the percentage of polyester hydroxyls reacted with isocyanate (OH conversion), 2) the isocyanate functionality of the prepolymer (NCO functionality), and 3) the acrylate functionality of the prepolymer, (acrylate functionality).

Figure 3A:
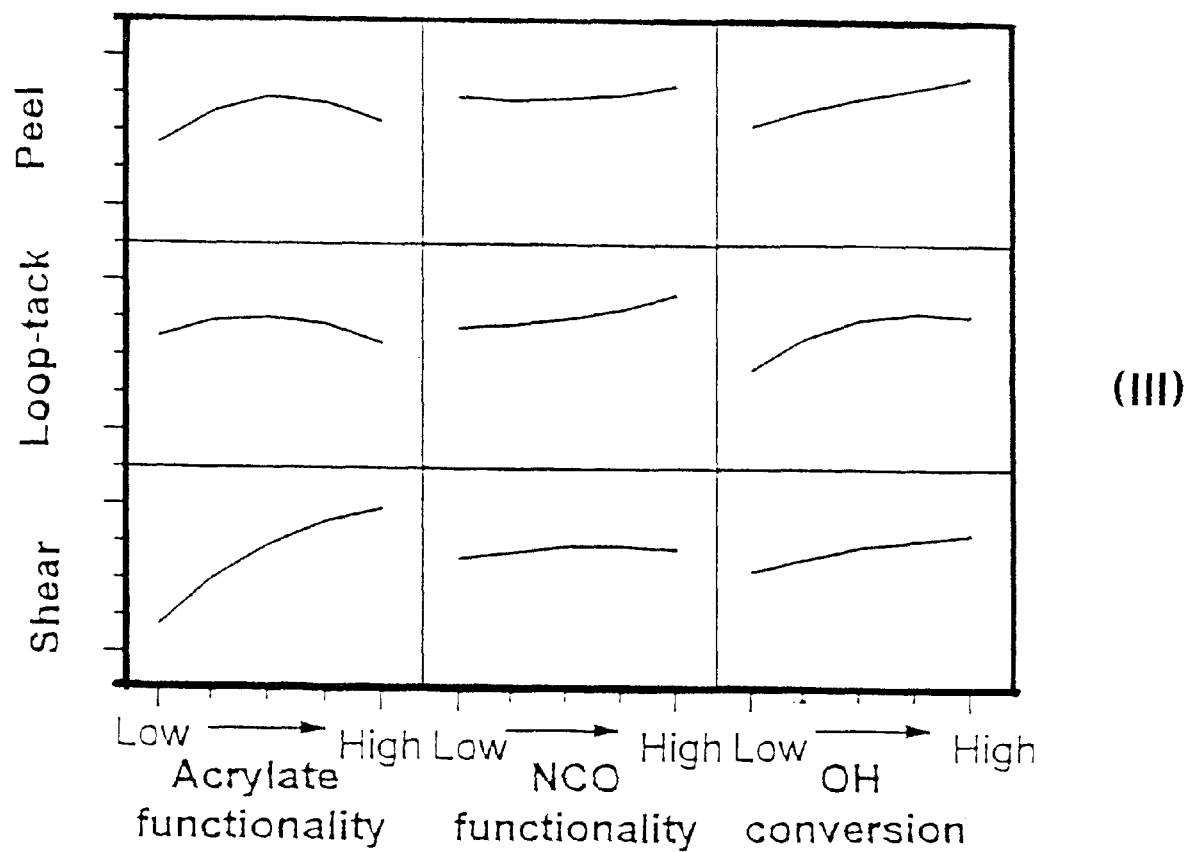
FIG. 3A depicts examples of pressure sensitive adhesive performance of a radiation cured composition based on a single polyester reacted with prepolymers, varying in acrylate functionality, isocyanate functionality and hydroxyl conversion.

The general trends of this study may be found in FIG. 3A. Accordingly, FIG. 3A exemplifies that acrylate functionality is the dominant variable for the shear resistance of the PSA, whereas the degree of conversion with OH groups has an effect on all PSA properties. NCO functionality has the least noticeable effect on the PSA properties, except for the fact that below a certain minimum of NCO-functionality, insufficient linking of the two blocks (i.e., prepolymer and polyester) occurs and the cured product does not exhibit sufficient cohesive strength to function as a PSA.

Although acceptable tack and shear resistance values could be obtained, all peel values were quite low, in fact, too low to be of interest for the majority of commercial applications. The polyester used in this study had a low Tg of −50° C. On the one hand, this resulted in excellent wet-out properties indicated by loop-tack values up to ten times higher than the corresponding peel. On the other hand, it is surmised that the low Tg is also the cause of low peel values.

The present inventors have discovered that these disadvantages can be overcome by employing a composition comprising at least two hydroxyl polyesters which are combined and then reacted as a blend with a prepolymer functionalized with (meth)acrylates, isocyanates and mixtures thereof. As used herein, (meth) acrylates includes both methacrylates and acrylates.

The present invention discloses radiation curable pressure-sensitive adhesives comprising the reaction product of a blend of at least two hydroxy polyesters having different glass transition temperatures (Tgs), with at least one prepolymer functionalized with (meth)acrylates, isocyanates and mixtures thereof. The present invention further discloses a composition comprising a blend of at least two hydroxy polyesters, wherein the difference in glass transition temperature (Tg) between the hydroxyl polyester is at least about 10° C., preferably greater than about 15° C., and more preferably greater than about 20° C. Preferably, the composition comprises a blend of at least two hydroxy polyester wherein the first hydroxy polyester has a Tg of less than about −35° C. and the second hydroxy polyester has a Tg greater than about −35° C. In a more preferred embodiment, the first hydroxy polyester can be characterized as having a Tg ranging from about −60° C. to about −30° C., and the second hydroxy polyester has a Tg ranging from about −20° C. to about 30° C. At Tgs of greater than about 30° C. the hydroxyl polyester has limited utility for PSA's because of the lack of flexibility and tack. However, hydroxyl polyester having a Tg greater than about 30° C. are contemplated to have utility for coatings and non-pressure sensitive adhesive applications. At Tgs of less than about −60° C. excess amounts of tackifier would be needed which would interfere with the curing mechanism and diminish the heat resistance of the final product.

In another embodiment, the present invention discloses radiation curable compositions comprising a hydroxyl polyester having a Tg higher than the polyesters used in previous radiation curable adhesive compositions.

The hydroxyl polyesters useful in the invention are preferably side chain polyesters as described in U.S. Pat. No. 4,668,763. These polyesters are essentially linear in the main chain, and preferably have branched alkyl side chains. Such polyesters are especially preferred for the lower Tg polyester according to this invention. The alkyl side chains along the main chain of the polyester lower the Tg of the polymer and, at the same time, permit the use of higher polarity components in the polyester main chain, which in turn, improves the adhesive properties. As described in the above reference, tri- and polyfunctional carboxylic acids, such as trimellitic acid, trimesinic acid, hemimellitic acid, pyromellitic acid and, very preferentially trimellitic anhydride are partially esterified with monoalcohols in order to reduce the acid functionality for the polycondensation to 2 and to provide the structure for the alkyl side chains. Straight chain and, preferably branched chain alkanols with 4 to 36 carbon atoms, preferably 4 to 18 carbon atoms may be used.

Tri- and polyfunctional hydroxyl compounds may also be used for the manufacture of side chain polyesters. They may either be partially esterified or etherified with monocarboxylic acids or monoalkanols respectively to reduce their functionality to 2 and to provide the structure of the side chains. The triols and polyfunctional polyols include glycerin, pentaerythritol and, preferably trimethylolpropane, trimethylolethane and di-trimethylolpropane ether and their esters and ethers, and glycidyl esters of monocarboxylic acids, especially the so called versatic acids.

Suitable for building the alkyl side chains with polyols are straight chain or preferably branched aliphatic monocarboxylic acids with 4 to 36, preferably 4 to 18 carbon atoms.

In addition to the side chain carrying moieties, difunctional polyester building blocks may be used as known in the art of polycondensation. These include, mostly but not exclusively, saturated aliphatic and cycloaliphatic glycols such as ethylene glycol, butanediol, neopentyl glycol, hexanediol, methylpentane diol, nonanediol, cyclohexane dimethanol, diethylene glycol, triethylene glycol, low molecular weight polyethylene glycol and ethoxylated bisphenol A.

Useful as dicarboxylic acids are aliphatic dicarboxylic acids with 4 to 36, preferably 4 to 12 carbon atoms and aromatic dicarboxylic acids. Preferred among the aliphatic dicarboxylic acids are succinic, glutaric and adipic acid, among the aromatic diacids orthophthalic, isophthalic and terephthalic acid.

The molar ratio of side chain to main chain ester segments is preferably between 1.0 to 0.10 and 1.0 to 1.0.

Typically, side chain polyesters have a broad molecular weight distribution and molecular weights from about 1000 to about 10,000 or more, 2,000 to 5,000 being preferred. The hydroxyl number is between 10 and 100, preferably 20 to 60 mg KOH.

In addition to the side chain polyesters, hydroxyl polyesters as previously known in the art may be used for this invention in an amount of up to 50% and typically as the higher Tg polyester. They are composed of the polyester building blocks as outlined above, i.e., saturated aliphatic and cycloaliphatic diols and aliphatic and aromatic dicarboxylic acids and are preferably linear in the main chain.

Commercially available hydroxyl polyester are available from Hüls (Creanova, Germany) under the tradename Dynacoll as well as from C.P. Hall Co. (Bedfork, Ill.) under the tradename Urethall.

The blend of hydroxy polyesters is reacted with at least one prepolymer including those functionalized with (meth) acrylates, isocyanates and mixtures thereof.

The nature of the acrylate compounds or methacrylate compounds is unimportant as long as the compound in question has an additional group which is capable of reaction with the hydroxyl group of the polyesters.

In the simplest case, the acrylic acid, methacrylic acid or acrylic chloride or methacrylic chloride or the anhydrides of acrylic acid or methacrylic acid can be used.

The functionalization according to the reaction of 10% to 90% of the hydroxyl groups with dicarboxylic acid, tricarboxylic acid or their derivatives, the carboxyl groups thus formed, subsequently being reacted with glycidyl acrylate or glycidyl methacrylate are not preferred, because these compounds are difficult to handle. The usual polymerization inhibitors, of adducts of di-or triisocyanates or polyisocyanates or isocyanate prepolymers or polyesters or polyethers of low molecular weight with hydoxyalkylacrylates or hydroxyalkylmethacrylates must be added.

Preferably, isocyanatoalkylacrylate or isocyanatoalkyl methacrylate are used for the functionalization, alkyl having the meaning of ethyl or propyl.

Adducts which have an isocyanato group and an acrylate moiety or a methacrylate moiety can be used in a ratio of 1:1. These adducts are prepared prior to the reaction with the hydroxyl polyesters from, on the one hand, diisocyanates or, in some cases, polyisocyanates or isocyanato prepolymers of polyesters or polyethers of low molecular weight which have two isocyanate groups in the molecule and, on the other hand, from approximately equivalent molar amounts of hydroxyalkylacrylates or hydroxyalkylmethacrylates.

The preferred isocyanates are toluene diisocyanate, methylenediphenyl-4,4'-diisocyanate, hexamethylenediisocyanate, benzene-1,4-diisopropylisocyanate, isophoronediisocyanate and other diisocyanates. In like manner, triisocyanates can be used, which are also reacted with two mols of hydroxyl alkyl acrylate. Isocyanate prepolymers can be used in prepared form, for example as Desmodur PF (Bayer AG), or Tolonate (Rhone-Poulenc) or can be made from triethylene glycol, for example, by reaction with the above-named diisocyanates. In like manner, a reaction product of a molecular size of 3 or 5 from 2 mols of ethylene glycol and 1 mol of a dicarboxylic acid can be reacted with one of the diisocyanates and afterward reacted with hydroxyl alkyl acrylates, so that the said adduct is formed.

For the formation of the adducts, temperatures of 50° C. to 120° C. are sufficient. It is necessary to operate with the exclusion of atmospheric moisture, and to verify the reaction of the isocyanates and polyisocyanates down to a remainder of about 10% by analysis.

Preferably, the prepolymers are prepared based on the reaction of hydroxy-alkyl acrylate with isocyanate adducts of various functionality. The preferred prepolymers have a Tg ranging from about −40° C. to −20° C. and an Mn of about 2,000. Typically such prepolymers have a polydispersity (Mw/Mn) ranging from about 1.3 to 1.5 and an NCO content ranging from between about 0.3 to about 1.0 mole.

In general, lower molecular weight hydroxyl polyesters and prepolymers tend to reduce the viscosity of the composition, and thus improve the processability, whereas higher molecular weight polymers contribute to the overall cohesive strength, particularly when the composition is cross-linked via radiation to a lesser extent. Additional information concerning hydroxyl polyesters and functionalized prepolymers may be found for example in U.S. Pat. No. 4,822,829 issued to Müller et al. Apr. 18, 1989, incorporated herein by reference.

The reaction product of the hydroxyl polyesters and functionalized prepolymer may further comprise other ingredients including reactive diluents, tackifiers, plasticizers, fillers, stabilizers, photoinitiators, etc. For room temperature applied adhesives the amount of these additional ingredients may be as high as 90 wt-%. However, the amount is typically less than about 75 wt-% and preferably about 60 wt-% or less. In the case of warm melts, the amounts of these additional ingredients are generally no more than about 50 wt-%, typically no more than 40 wt-% and preferably no more than about 30 wt-%. In some instances the additional ingredients are simply added to extend the composition and hence reduce the cost. However, in most instances the additional ingredients are necessary to optimize the performance of the formulation by altering the tack, reducing the viscosity, and/or improving the thermal stability or radiation responsiveness etc.

The addition in particular of reactive diluents is preferred for pressure sensitive adhesive composition, to sufficiently lower the viscosity such that the compositions may be applied at room temperature (25° C.). For such applications the amounts of reactive diluent may be as high as about 75 wt-%, typically about 70 wt-% or less and preferably about 65 wt-% or less. Reactive diluent may also be employed for warm melt compositions at concentrations up to about 25 wt-%.

Reactive diluents contemplated for use in the present invention include a wide variety of free-radically polymerizable monomers.

Free-radically polymerizable monomers can be selected from acrylate, methacrylate and vinyl ester functionalized materials. Of particular use are acrylate and methacrylate materials. They can be monomers and/or oligomers such as (meth)acrylates, (meth)acrylamides, vinyl pyrrolidone and azlactones, as disclosed in U.S. Pat. No. 4,304,705, (Heilmann). Such monomers include mono-, di, or polyacrylates and methacrylates such as methyl acrylate, methyl methacrylate, ethyl acrylate, isopropyl methacrylate, isooctyl acrylate, isobornyl acrylate, isobornyl methacrylate, acrylic acid, n-hexyl acrylate, steryl acrylate, allyl acrylate, glycerol diacrylate, glycerol triacrylate, ethyleneglycol diacrylate, diethyleneglycol diacrylate, triethyleneglycol dimethacrylate, tetrahydrofurfuryl(meth)acrylate, 2(2-ethoxyethoxy)ethyl acrylate, 2-phenoxyethyl acrylate, ethoxylated$_4$ nonyl phenol acrylate, 1,6-hexanediol diacrylate, 1,3-propanediol diacrylate, 1,3-propanediol dimethacrylate, trimethyol propane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyl-dimethylmethane, bis[1-(3-acryloxy-2-hydroxy)]-propoxyphenyl dimethylmethane, tris-hydroxyethyl isocyanurate trimethacrylate; the bis-acrylates and bis-methacrylates of polyethylene glycols of molecular weight 200–500, copolymerizable mixtures of acrylated monomers such as those of U.S. Pat. No. 4,652,274, and acrylated oligomers such as those of U.S. Pat. No. 4,642,126, both of which are incorporated herein by reference.

As used herein, the term "tackifier" means any composition which is useful to impart tack to the hot melt adhesive composition. ASTM D-1878-61T defines tack as "the property of a material which enables it to form a bond of measurable strength immediately on contact with another surface". In general terms, tackifying resins are useful in the radiation curable composition of the invention in concentration ranging from 0 wt-% to about 50 wt-%, preferably in amounts ranging from 0 wt-% to 30 wt-%. Tackifying resins comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the foams of this invention. Representative examples of useful hydrocarbon resins include alpha-methyl styrene resins, branched and unbranched $C_5$ resins, $C_9$ resins, $C_{10}$ resins, as well as styrenic and hydrogenated modifications of such. Tackifying resins range from being a liquid at 37° C. to having a ring and ball softening point of about 135° C. Solid tackifying resins with a softening point not greater than about 130° C., more preferably with a softening point less than about 110° C. are particularly useful to improve the cohesive strength of the adhesives of the present invention.

For the pressure sensitive adhesive compositions of the present invention, the preferred tackifying resin is predominantly aromatic such as rosin derivatives and alphamethyl styrene based resins. However, aliphatic tackifying resins are also useful, particularly when a second tackifier or mutually compatible plasticizer is employed.

The radiation curable compositions of the invention acquire the PSA adhesive a characteristics upon exposure to a radiant energy source such as electron beam or ultraviolet light (UV). Industrial use medium pressure mercury vapor lamps (with or without electrodes) are commonly used to cure the composition. In the case of UV curing, one or more photoinitiators and/or photosensitizers are added to the composition prior to exposure to the radiant energy source. Insuring that the emission of the light source corresponds with the absorption of the photoinitiator is critical. The photoinitiators and/or photosensitizers are typically employed in concentrations ranging from about 0.5 wt-% to about 6 wt-%, preferably in amounts ranging from about 1 wt-% to about 4 wt-%. The concentration is chosen based on the thickness of the application of the uncured radiation curable composition. Both "hydrogen abstraction" type and "alpha cleavage" type free radical initiators may be employed. Commercial examples include Irgacure 651, 184 and 1700 and Darocur 1173, available from Ciba-Geigy as well as Genocure LBP available from Rahn.

The radiation cured adhesive compositions of the present invention exhibit the following properties.

|  | Useful | Preferred | Most Preferred |
| --- | --- | --- | --- |
| "Peel" | 1 to 4 N/25 mm | 2 to 6 N/25 mm | 6 to 15 + N/25 mm |
| "Loop Tack" | 3 to 6 N | 6 to 9 N | 8 to 15 + N |
| "Shear" | 1–30 minutes | 30 minutes–3 hours | >24 hours |
| "Flexibility" (Tg) | −5 to 10° C. | −15 to 5° C. | −20 to 0 |

The radiation cured adhesives of the present invention exhibit excellent flexibility, excellent shear resistance at high temperatures and excellent wet-out properties as well as good peel adhesion. The adhesive composition of the present invention preferably exhibits a substantial improvement with respect to at least one adhesive property. More preferably, the radiation cured adhesive composition exhibits an improved balance of properties such that at least one property is enhanced, meaning the performance falls within the preferred or most preferred target ranges, while also maintaining or improving other properties simultaneously. The adhesive composition of the present invention preferably exhibits a "Peel" of at least about 1.5 N/25 mm, and/or a "Loop Tack" of at least about 4 N, and/or a "Shear" of greater than 24 hours. More preferably the Loop Tack is at least 2 times and preferably 3 to 4 times greater than the peel.

The radiation curable compositions of the present invention are particularly useful for warm melt and room temperature applied pressure sensitive adhesive applications such as tapes, labels, and a wide variety of self-adhesive products. The inventive compositions are particularly useful for more demanding PSA applications requiring high heat resistance and/or plasticizer resistance and/or chemical resistance such as printer labels, tapes and labels for under the hood of automobiles and medical tapes, devises and bandages which are adhered to skin. The uncured composition is applied to a substrate such as films including polyvinyl chloride, polyester polyolefins, polymeric foams, foil or paper and then cured by exposure to a radiant energy source.

The invention is further illustrated by the following non-limiting examples.

EXAMPLES

Test Methods

Molecular weight distribution was characterized by GPC calibrated with polystyrene standards. A Waters 510 pump and 410 refractive index detector, equipped with Ultrastyragel columns ($10^5$, $10^4$, $10^3$ and 100x) were used.

Viscosity of the polyesters was measured on a Brookfield DV-1 viscometer with a thermosel and a 74-R temperature controller, at 100° C. Tgs were determined by DSC (Dupont DSC 2100) from heating scans at 20° C./min.

Preparation of the PSA Samples

PSA properties were measured on 25 g/m$^2$ films cast from the polymers, heated to 100° C., onto 2 mil PET film (Mylar®) from Dupont de NeMours (Wilmington, Del.). These were then exposed to UV light, (Fusion F-300 conveyor belt irradiator with a 300 W/inch H lamp). Properties were independent of the energy irradiated when exposed twice at a conveyor speed of 7.6 mpm (meter per minute) or a higher dosage. Measured with a Power-Puck radiometer (EIT), the peak UV intensity and energy obtained after exposing it twice at 7.6 mpm are as follows:

|  | UV A | UV B | UV C | UV V |
| --- | --- | --- | --- | --- |
| Intensity (w/cm$^2$) | 1.673 | 1.702 | .151 | 1.363 |
| Energy (joules/cm$^2$) | 1.288 | 1.290 | .127 | 1.003 |

Peel was measured on stainless steel following PSTC-1 method. Loop-tack was tested on stainless steel according to FTM-8 method.

Shear or holding power was measured on stainless steel according to PSTC-7 method at 100° C. and room temperature under 2 psi.

Loop Tack was measured on stainless steel according to PSTC-5.

Dynamic Mechanical Analysis (DMA) was performed on a Rheometrics Scientific RDS 70700, in a parallel plate geometry, at 62.83 rad/s from about 60° C. to about –60° C.

Gel content was determined following a procedure similar to ASTM D3616-82, using MEK as solvent.

SAFT—shear adhesion failure temperature, was tested as described below:

The 1"×1" adhesive sample on 2 mil mylar was placed on a solvent cleaned stainless steel panel and rolled down with a standard 4.5 lb. roller. The samples sat for 30 minutes at 73° F./50% relative humidity and were placed in a 200° F. oven. A 500 gr. weight was suspended from each sample. After one minute equilibration, the timer was started and the oven temperature was increased at a rate of 1° F. per minute to a final temperature of 350° F. The failure temperature of each sample and mode of failure was noted if it failed.

The characteristics of the amorphous polyesters used in the examples are summarized in Table I below:

TABLE I

| Polyester | Chemical Structure | Tg (°C.) | OH #(mg/g) | Functionality |
| --- | --- | --- | --- | --- |
| "A"- Dynacoll A2500 | Aliphatic slightly branched | –50 | 30 | >2 |
| "B"- Urethall 8050-55 | Strictly linear, cycloaliphatic | –35 | 55 | 2 |
| "C"- Dynacoll A 3200 | Linear aliphatic/ aromatic | –20 | 37 | 2 |
| "D"- Dynacoll 7110 | Linear aliphatic/ aromatic end-capped | 10 | 55 | ~<2 |
| "E"- Dynacoll 7130 | Linear aliphatic/ aromatic | 30 | 35 | 2 |

A series of polyester blends, 1:1 with respect to weight (w/w), were prepared with the single hydroxyl polyesters described in Table I. The properties of the uncured hydroxy polyester blends are characterized as described in Table II:

TABLE II

| Polyester Blend | Tg (°C.) | Difference* in Tg of the Polyesters | Mn (g/mol) | Mw/Mn |
| --- | --- | --- | --- | --- |
| AC | –47 | 30 | 5,410 | 3.6 |
| AB | –44 | 15 | 5,640 | 3.3 |
| AD | –43 | 40 | 4,000 | 5.0 |
| AE | –36 | 80 | 5,370 | 3.3 |
| CD | –14 | 30 | 3,520 | 2.0 |

*absolute value

Prepolymer L/H was prepared by reacting the isocyanurate of hexanedioldiisocyanate with 2-ethylhexanol and 2-hydroxyethylacrylate in a 1/0.6/0.1 equivalence ratio. The resulting L/H prepolymer has an NCO content of 4.2% and a low to medium acrylate functionality.

The blends of hydroxy polyesters were reacted with this L/H prepolymer to a hydroxyl group conversion of 50%, (H1) and combined with 2% w/w of Darocur® 1173, a UV-photoinitiator available from Ciba-Geigy (Hawthorne, N.Y.). The products synthesized are characterized in Table III.

TABLE III

| Uncured Polyester Block | Tg (°C.) | Mn (g/mol) | Mw/Mn | Viscosity (mPa · s) |
| --- | --- | --- | --- | --- |
| Ex. 1 - AC | –41 | 9,800 | 12 | 7,700 |
| Ex. 2 - AB | –40 | 9,340 | 4.75 | 7,275 |
| Ex. 3 - AD | –32 | 6,400 | 4.8 | 3,340 |
| Ex. 4 - AE | –30 | 9,700 | 6.55 | 17,750 |
| Ex. 5 - CD | –15 | 6,500 | 2.3 | 4,800 |

By employing polyester A in combination with a second polyester, blocks of higher Tgs were obtained while still benefiting from the excellent flexibility polyester A contributes alone.

In all instances, the reaction with the prepolymer results in an increase of molecular weight as a consequence of the chain extension. When the functionality of at least one of the polyesters is 2 or higher, the reaction results in a product exhibiting a broader molecular weight distribution, MWD. On the other hand, the molecular weight distribution barely changes relative to the uncured blend for blends in which both polyesters have a functionality of 2 or less. In these instances, branching is severely limited by the lower functionality of the polyester and thus limits the MWD.

The Tg of the reacted products is a function of the Tgs of both blocks, polyester and prepolymer, and their weight ratio. The Tg of the prepolymer is higher than the polyester blocks except for CD blend. Thus, with the exception of the latter, the reacted product exhibits a higher Tg. The product based on the block AE resulted in significantly higher viscosity due to the stiffness of the E block.

Table IV depicts the performance data for examples exposed twice at 7.6 mpm. Properties were independent of the energy irradiated at this dosage or higher.

TABLE IV

| Ex. No. Polyester Block | Peel (N/25 mm) | Loop Tack (N) | Shear 100° C., 1 kg | Gel cont. % | DMA Tg °C. | G'/G" cross T °C. |
|---|---|---|---|---|---|---|
| Ex. 6 AC | 2.1 ± 0.1 adh. | 7.2 ± 1.3 adh. | >24 h | 41 ± 4 | −25 | 7.5 |
| Ex. 7 AB | 1.8 ± 0.2 adh. | 9.0 ± 2.7 adh. | >24 h | 58 ± 1 | −20 | 15 |
| Ex. 8 AD | 6.8 ± 1.4 adh. | 10.6 ± 2.2 adh. | <1 h coh. | 77 ± 3 | −2.5 | No cross |
| Ex. 9 AE | 4.3 ± 1.1 adh. | 6.3 ± 0.9 adh. | <1 h coh. | 55 ± 4 | −4 | No cross |
| Ex. 10 CD | 11.9 ± 2.3 adh. Or overload coh. Or zips | 3.1 ± 2.2 adh. | <1 h coh. | 76 ± .5 | 4.35 | No cross | adh. = adhesive failure
coh. = cohesive failure

This illustrates the characteristic data of cured products based on polyester blends reacted with L/H prepolymer to a (FHI) conversion of 50% of the hydroxyl groups.

The cured adhesive products, Examples 1 and 2 (AB and AC) exhibited comparable results. Both displayed excellent shear resistance even at high temperatures. The peel values in comparison to a product employing polyester A alone are approximately doubled while maintaining remarkable tack and adhesive failure. For example, a product resulting from the reaction of this same L/H prepolymer with polyester A provides 1.3 N/25 mm peel values and loop tack values of 10.9 N/25 mm. By blending A with B and/or C, the loop tack values are still 3 and 4 times larger than the corresponding peel values. The Applicants surmise that in order to provide high tack values, the adhesive deformation in the bonding stage has to be in large part viscous to dissipate the stress created in the adhesive. Accordingly, Polyester A provides this stress-dissipating property as a result of its high molecular weight and flexible backbone. AB and AC products after curing display a Tg around −20° C. and exhibit characteristics of removable PSAs. The modulus versus T curves correspond to crosslinked polymers. The transition from viscous to crosslinked, rubberlike behavior occurs at around 10° C.

The Applicants have found that increasing the Tg of the blocks results in higher peel values. Thus AD and AE products with network Tgs around −3° C. gave three times the peel of AC or AB, but comparable loop-tack values. Adhesive failures were obtained indicating sufficient flow and cohesive strength of the adhesive. However, these adhesives did not hold at high temperatures. The DMA curves showed G' and G" gradually decreasing with temperatures above the glass transition temperature and are congruent over all the temperature ranges. This behavior is characteristic of polymers at the gel point. Further increase of the Tg block, as in the CD product, results in a less compliant polymer and insufficient tack at room temperature. The polymer does not flow as easily. This product appears to be at the borderline and samples gave the three possible failure modes during the peel experiments. Peel values tend to be significantly higher when cohesive failure is obtained. However, even in the case of adhesive failure, peels up to 13.5 N/25 mm were obtained. Shocky, zippery, or otherwise described as stick-slip peel was also observed. There seems to be a correlation between the shear at high temperature and the variation of G' and G" with temperature. When the extent of crosslinking is sufficient, the transition to an elastic, rubber-like behavior is indicated by the G'/G" cross-over point.

The values obtained for gel content do not correlate with the holding power. Usually a high gel content can be linked to a high degree of crosslinking and an enhanced shear at high temperature. The apparent discrepancy is probably linked to the complexity of the structure of these networks.

From the above characterization the blend AD was selected on the basis of exhibiting the best balance of properties. A prepolymer with an increased acrylate functionality, M/H, was prepared by reacting the isocyanurate of hexanedioldiisocyanate with 2-ethylhexanol and 2-hydroxyethylacrylate at an equivalence ratio of 1/0.6/0.2. The M/H prepolymer was reacted with AD polyester blend to 50% (HI) OH conversion. The characterization results for uncured and cured products are included in Table V and VI. Table V depicts the uncured acrylated polyesters based on AD polyester blend, varying the acrylate functionality and OH conversion; whereas Table VI depicts the properties of cured acrylated polyesters based on AD polyester blend, varying the acrylate functionality and OH conversion.

TABLE V

| Example # Prepolymer Acry/NCO | OH % reacted | Tg (°C.) | Mn (g/mol) | Mw/Mn | Viscosity (mPa · s) |
|---|---|---|---|---|---|
| Ex. 11 - L/H | H1 | −32 | 6,400 | 4.8 | 3,340 |
| Ex. 12 - M/H | H1 | −34 | 5,800 | 4.4 | 2,650 |
| Ex. 13 - L/H | H2 | −32 | 6,700 | 7.5 | 6,550 |
| Ex. 14 - L/H with tackifier | H2 | −25 | 5,230 | 7.8 | 5,900 |

L/H = 0.5/1.0
M/H = 0.75/1.0
H1 = 50%
H2 = 60%

TABLE VI

| Example # Prepolymer Acry/NCO | OH % conv. | Peel (N/25 mm) | Loop-Tack (N) | Shear 100° C., 1 kg | Gel content % | DMA, Tg (°C.) | G'/G" cross T (°C.) |
|---|---|---|---|---|---|---|---|
| Ex. 11 - L/H | H1 | 6.8 ± 1.4 adh. | 10.5 ± 2.2 adh. | <1 h coh. | 77 ± 3 | −2.5 | no cross |
| Ex. 12 - M/H | H1 | 5.5 ± 0.6 adh. | 11.2 ± 2.6 adh. | >24 h | 61 ± 1 | −5.3 | 25 |
| Ex. 13 - L/H | H2 | 9.6 ± 1.9 adh. | 15.7 ± 3.6 adh. | >24 h | 67 ± .3 | −5.2 | 34 |
| Ex. 14 - L/H with tackifier | H2 | 12.5 ± 2.7 adh. | 24.2 ± 4.0 adh. | >24 h | | 1.4 | 43 |

As can be seen, both uncured products exhibit similar characteristics. The increase in the acrylate functionality of the prepolymer resulted in a product with a narrower polydispersity and lower viscosity. For the cured product, the holding power at high temperature is significantly enhanced as a result of the higher crosslinking density resulting from the higher amount of acrylate groups. Peel values are 1N/25 mm lower but loop tack is similar. Tan δ was measured to be −5° C. and the G'/G" cross over occurs at 25° C.

When the reaction of the polyester block AD with prepolymer L/H is carried out to an OH conversion of 60% (H2), viscosity almost doubles, as the number of urethane linkages and branching increases.

As shown in Table VI, there is a significant increase in peel, loop tack and shear even at 100° C. With a higher OH conversion there is more chain extension and branching, resulting in a polymer with improved cohesive strength.

Both this product and the product of the reaction with M/H prepolymer, display very similar DMA curves characteristic of slightly crosslinked polymers. The Tg of the network was comparable at around −5° C., whereas the lower acrylate functionality of the prepolymer causes the cross-over temperature to be 10° C. higher.

With the addition of tackifier it is possible to further optimize the PSA performance of these systems. 10% w/w of an alpha-methyl styrene tackifier, Kristalex 3070, was added to the product. While keeping the excellent shear at high temperature, there was a 30% increase in peel and a 50% increase in tack with consistent adhesive failure.

Figure 1A:
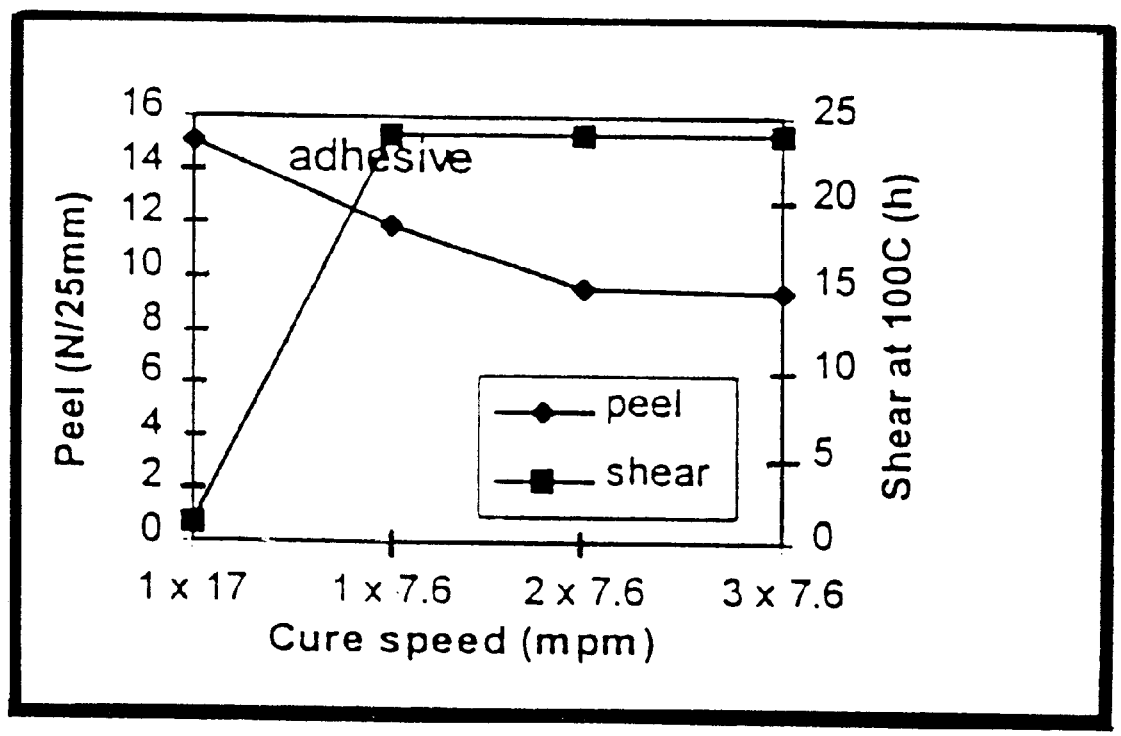
FIG. 1A (Example 13) depicts the effect of cure time as a function of peel and shear.

It is known that radiation curable PSAs are dependent on the nature and dosage of a the radiation. The present invention adds a degree of freedom in maximizing properties for such systems. For the compositions studied, there were not significant changes in properties after curing with a certain amount of energy (2 passes at 7.6 mpm). Two kinds of patterns were observed. The first class corresponds to those blends which show good shear at high temperature, that is, blends AC, AB and AD at the U2 level of OH conversion as depicted in FIG. 1A. As the exposure time decreases, peel values increase, but shear abruptly falls. For AC, for example, peel increased from 2.1 to 3.9 N/25 mm when only exposed once at 17 mpm. For AD, peel increased from 9.6 to 15.1 N/25 mm and adhesive failure was recorded in all cases.

On the other hand, the compositions that do not pass the shear test at high temperature do not improve with further exposure. Peel values increase with shorter exposure, and type of failure changes from adhesive to cohesive upon certain dosage. Thus, when only exposed once at 17 mpm, AE gives up to 15 N/25 mm, compared to 4.3 N/25 mm at the plateau.

Figure 2A:
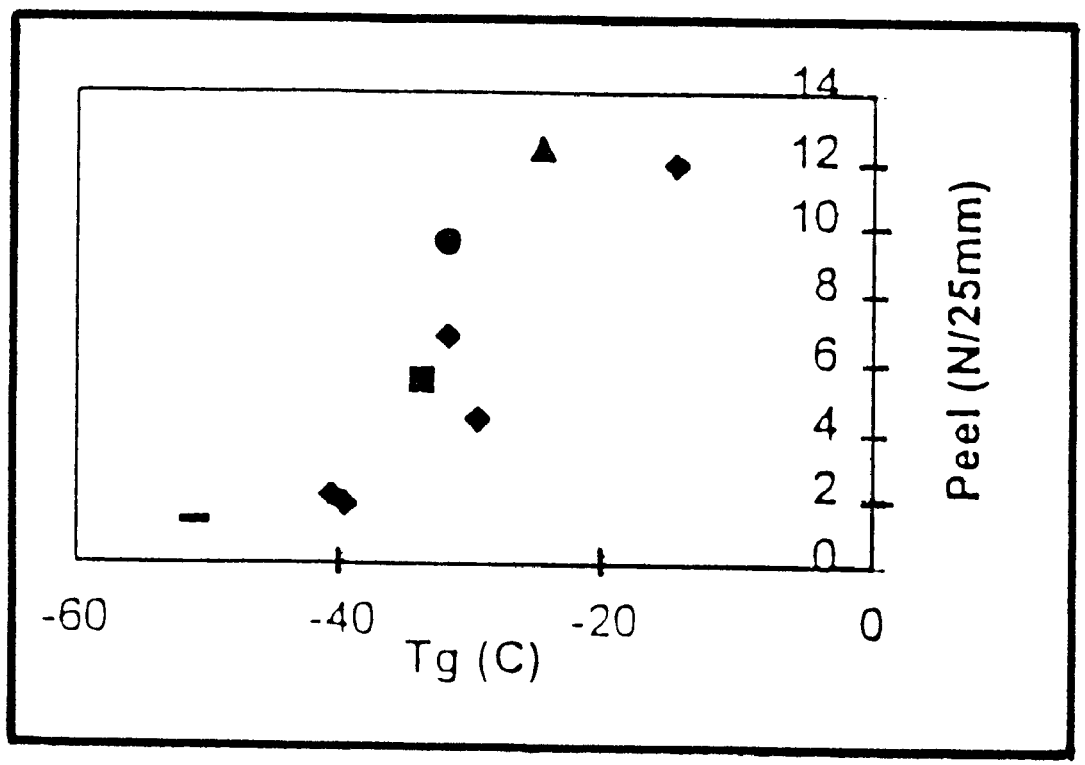
FIG. 2A, 2B and 2C depict the relationship between the PSA properties "Peel", "Loop Tack" and "Shear" of the cured PSA as a function of Tg of the uncured acrylated polyester blend.
Figure 2B:
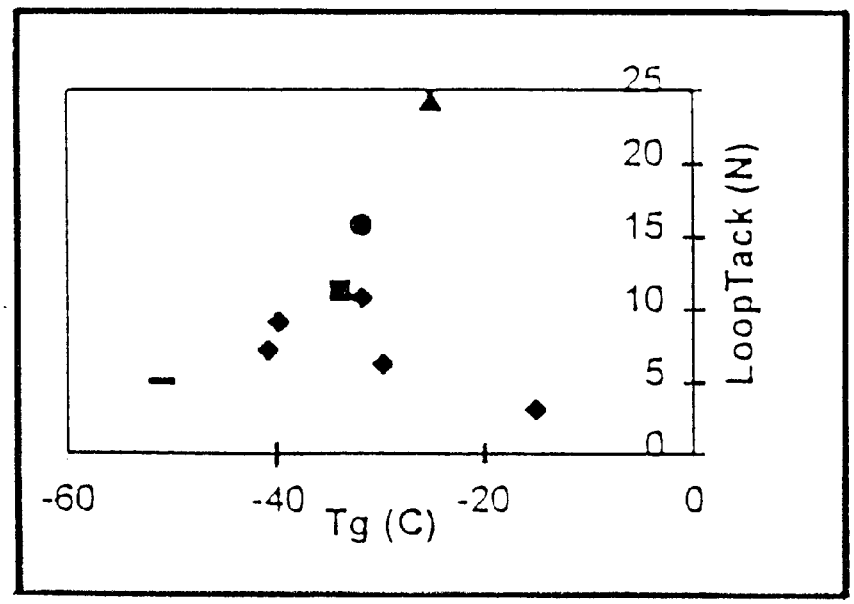
Figure 2C:
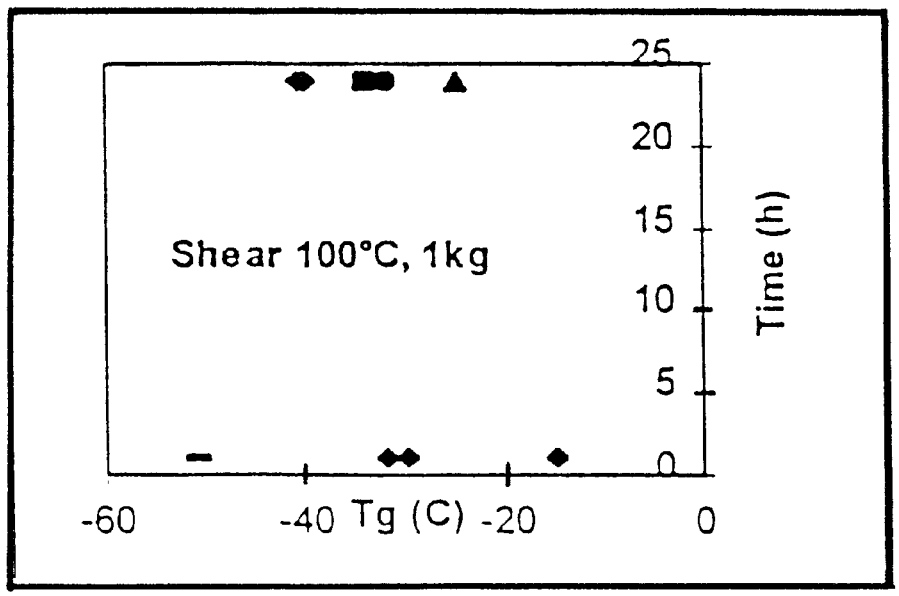

The examples demonstrate that peel values can be varied over a wide range. Peels can be increased by increasing the degree of OH conversion and particularly by introducing polyester blocks with a higher Tg. Loop-tack goes through a maximum with increasing Tg, indicating the necessity for segment mobility (that is low Tg) and good adhesion (high Tg). Shear depends primarily on the degree of crosslinking, and thus, for this system, on acrylate functionality of the prepolymer and not on Tg. These trends are summarized in FIGS. 2A, 2B and 2C. Radiation dosage tends to increase the degree of crosslinking with the corresponding increase in shear values and decrease in peel values before reaching a plateau.

The following examples demonstrate the PSA performance that results by first acrylating the individual polyesters and then blending the previously acrylated polyesters in comparison to first combining the hydroxy polyester and then acrylating the blend.

Example 15

50 g Polymer B acrylated to H1 with prepolymer L/H
50 g Polymer A acrylated with the prepolymer resulting from the reaction of isophorone diisocyanate and 2-hydroxyethylacrylate in a 2/1 equivalence ratio. A different prepolymer was selected to insure the same degree of conversion without gelling.
2 g Irgacure 184 1-hydroxycyclohexyl phenyl ketone Results:

| | A to H1 + B to H1 | AB to H1 |
|---|---|---|
| Viscosity @ 100° C. (mPa · s) | 3,575 | 7,275 |
| Peel (N/25 mm) | 1.9 ± 0.5 | 1.8 ± 0.2 |

-continued

|  | A to H1 + B to H1 | AB to H1 |
|---|---|---|
| Loop Tack (N) | 4.5 ± 1.0 | 9.0 ± 2.7 |
| Shear @ 100° C., 1 kg | 5 minutes | >24 hour |

Room Temperature Applied PSAs

Room temperature applied formulations were prepared by mixing the reactive diluents or polymer and tackifier into the preheated polymer at approximately 60° C.–80° C.

Following the same procedure described for the warm melts experiments, the formulations were cast onto PET film using a hand draw-down applicator resulting in 25 g/m² adhesive coverage. These were then exposed to the UV light twice at 7.6 mpm.

Example 16

| 31.2 | SR-339 | Sartomer Co. | 2-phenoxyethyl acrylate |
|---|---|---|---|
| 31.2 | SR-504 | " | ethoxylated$_4$ nonyl phenol acrylate |
| 33.6 | Polymer of Example 13 | | |
| 4 | Irgacure 184 | | 1-hydroxycyclohexyl phenyl ketone |
| | Viscosity @ 25° C. (mPa · s) | | 2,070 |
| | Peel (N/25 mm) | | 5.1 ± 0.7 |
| | Loop Tack (N) | | 11 ± 0.5 |
| | Holding power @ 100° C., 1 kg | | >24 h |

Mn = 354
Mw/Mn = 3 L

Example 17

| 50.4 | SR-339 | Sartomer Co. | 2-phenoxyethyl acrylate |
|---|---|---|---|
| 45.6 | Polymer of Example 6 | | |
| 4.0 | Irgacure 184 | | 1-hydroxycyclohexyl phenyl ketone |
| | Viscosity @ 25° C. (mPa · s) | | 3,790 |
| | Peel (N/25 mm) | | 3 ± 0.1 |
| | Loop Tack (N) | | 6 ± 0.2 |
| | Holding power @ 100° C., 1 kg | | >24 h |

Mn = 263
Mw/Mn = 73

Example 18

| 52.8 | SR-504 | Sartomer Co. | ethoxylated$_4$ nonyl phenolacrylate |
|---|---|---|---|
| 9.6 | Kristalex 3070 | Hercules | |
| 33.6 | Polymer of Example 13 | | |
| 4.0 | Irgacure 184 | | 1-hydroxycyclohexyl phenyl ketone |
| | Viscosity @ 25° C. (mPa · s) | | 12,050 |
| | Peel (N/25 mm) | | 4.5 ± 0.5 |
| | Loop Tack (N) | | 9.5 ± 0.5 |
| | Holding power @ 100° C., 1 kg | | >2 minutes |

Mn = 641
Mw/Mn = 17
SAFT = 177 C

We claim:

1. A radiation curable composition comprising the reaction product of at least two hydroxy polyesters having different Tgs and at least one prepolymer functionalized with (Meth) acrylates, isocyanates and mixtures thereof, wherein the difference in Tg is at least about 10° C.

2. The radiation curable composition of claim 1 wherein at least 50% of the blended polyesters have side chains.

3. The radiation curable composition of claim 1 further comprising at least one photoinitiator.

4. The radiation curable composition of claim 1 wherein the difference in Tg is at least about 15° C.

5. The radiation curable composition of claim 1 wherein the difference in Tg is at least about 20° C.

6. A pressure sensitive adhesive comprising the composition of claim 1.

7. The pressure sensitive adhesive of claim 6 further comprising at least one ingredient selected from the group consisting of tackifiers, plasticizers, reactive diluents, and mixtures thereof.

8. The pressure sensitive adhesive of claim 7 wherein said composition is applied to a substrate at a temperature ranging from room temperature to 120° C.

9. The radiation curable composition of claim 1 wherein said first hydroxy polyesters has a Tg of less than −35° C., and said second hydroxy polyester has a Tg of greater than −35° C.

10. The radiation curable composition of claim 1 wherein said first hydroxy polyester has a Tg ranging from about −30° C. to about −60° C. and said second hydroxy polyester has a Tg ranging from about −20° C. to about 30° C.

11. A method of using a radiation curable adhesive composition comprising the steps of:

a) providing the radiation curable composition of claim 1;

b) applying said composition to a substrate; and c) exposing said composition to a radiant energy source to cure said composition to a pressure sensitive adhesive.

12. The method of claim 11 wherein the substrate is selected from the group consisting of paper, film or foil.

13. The method of claim 12 wherein said film is selected from the group consisting of polyvinyl chloride, polyester, polyolefins and polymeric foams.

14. An article selected from the group consisting of tape, labels, medical devices, medical tapes, bandages, and automotive tapes and labels comprising a substrate coated with the cured radiation curable composition of claim 1.

15. The pressure sensitive adhesive of claim 6 wherein the peel ranges from about 1 N/25 mm to greater than 15 N/25 mm.

16. The pressure sensitive adhesive of claim 6 wherein the loop tack ranges from about 3 newtons to greater than 15 newtons.

17. The pressure sensitive adhesive of claim 6 wherein the shear ranges from about 1 minute to greater than 24 hours.

18. The pressure sensitive adhesive of claim 7 wherein said tackifier is present in an amount up to 50 wt-%.

19. The pressure sensitive adhesive of claim 18 wherein the tackifier is aromatic including rosin ester and alpha methyl styrene tackifying resins.

20. The pressure sensitive adhesive of claim 7 wherein said reactive diluent is a monomer selected from the group consisting of 2-phenoxyethyl acrylate, isobornyl acrylate, 2(2-ethoxyethoxy) ethyl acrylate, ethoxy$_4$ nonyl phenol acrylate, tetrahydrofurfuryl acrylate, and mixtures thereof.

* * * * *